(12) United States Patent
Teeter et al.

(10) Patent No.: US 7,753,678 B2
(45) Date of Patent: Jul. 13, 2010

(54) METHOD AND APPARATUS FOR PRODUCING CHARCOAL

(75) Inventors: Gerald A. Teeter, Charlotte, NC (US); Jared S. Kaufman, Pittsburgh, PA (US); John L. Pressly, Charlotte, NC (US); Christopher Adam Goebel, Waxhaw, NC (US); Paul David Debski, Pittsburgh, PA (US)

(73) Assignee: Nucor Corporation, Charlotte, NC (US)

( * ) Notice: Subject to any disclaimer, the term of this patent is extended or adjusted under 35 U.S.C. 154(b) by 834 days.

(21) Appl. No.: 11/160,145

(22) Filed: Jun. 10, 2005

(65) Prior Publication Data
US 2006/0280670 A1      Dec. 14, 2006

(51) Int. Cl.
*F27B 3/22* (2006.01)
(52) U.S. Cl. .................. 432/176; 432/72; 432/152; 432/15; 432/58; 432/77; 110/229; 110/230; 110/231; 110/233; 110/234; 110/204; 110/341
(58) Field of Classification Search .................. 432/15, 432/58, 77, 72, 152, 176; 110/229, 230, 110/231, 233, 234, 204, 341
See application file for complete search history.

(56) References Cited

U.S. PATENT DOCUMENTS

| 4,385,905 A | * | 5/1983 | Tucker | ................ 48/62 R |
| 6,261,090 B1 | | 7/2001 | Boswell et al. | |

FOREIGN PATENT DOCUMENTS

| BR | PI9802964-9 | 5/2000 |
| BR | PI9806361-8 | 7/2000 |
| BR | PI0104966-6 | 7/2004 |

OTHER PUBLICATIONS

Alvaro Lucio et al., "Turning Biomass Into Metallurgical Charcoal Through a New Clean Carbonization Process", Technical Contribution to the 2nd International Meeting on Ironmaking, Sep. 12-15, 2004, Vitoria, Brazil.

* cited by examiner

*Primary Examiner*—Melvin C Mayes
*Assistant Examiner*—Melissa Stalder
(74) *Attorney, Agent, or Firm*—Hahn, Loser & Parks, LLP; Arland T. Stein (57) ABSTRACT

Apparatus for batch processing source material into charcoal in a battery of kilns, each of which use forced convection of process gases through the source material to shorten the process cycle time, and all of which use an external combustor to burn the process waste gases from each kiln to provide the primary source of applied energy for the process.

10 Claims, 9 Drawing Sheets

FIG. 11

METHOD AND APPARATUS FOR PRODUCING CHARCOAL

COPYRIGHT

The contents of this document are subject to copyright protection. The copyright owner maintains all rights in copyright to these contents but has no objection to their reproduction in the form published by the United States Patent and Trademark Office.

TECHNICAL FIELD

This invention relates to a method and apparatus for the manufacture of charcoal, and more particularly to the large scale production of charcoal for industrial fuel applications.

BACKGROUND ART

As known, charcoal is the solid carbon residue resulting from pyrolysis of carbonaceous materials having a cellulosic fiber structure. These include woody materials and vegetable biomass, such as tree stock, tree bark, twigs, sawdust, and even nut shells, as well as processed materials, such as corrugated paper board and paper. Depending on whether the produced charcoal is a commercial product or the byproduct of solid waste disposal, its intended use determines the type of carbonaceous material used as the source charge.

The common industrial use of charcoal is as a fuel. In many instances it is used as a fuel for outdoor cooking, but in countries with limited fossil fuel reserves it is commonly used as a fuel source in commercial manufacturing applications. One such application is in the production of pig iron, an early product of the overall steel manufacturing process. There it is used to fuel blast furnaces in integrated mills which produce the iron from iron ore. These type of industrial applications have a high energy demand and consume large quantities of fuel. Since charcoal does not have the heat content of coke its use in these applications consumes a proportionately higher volume of charcoal. This higher volume consumption places a high demand for lower unit cost charcoal, which in turn places high priority on both the efficiency and scale of industrial charcoal production methods and equipment.

The source materials for industrial charcoal are medium to dense raw hardwoods, such as beech, birch, hard maple, hickory, and oak. Others are softwoods; primarily long leaf and slash pine. The current charcoal manufacturing kilns are either batch process or continuous multiple hearth kilns. Due to the higher labor requirements of the batch kilns, which are manually-loaded and -unloaded, continuous hearth kilns are more commonly used. In addition to their limited labor, the continuous kilns also provide a higher produced charcoal volume than batch kilns. Existing batch kiln, such as the Missouri-type charcoal kilns producing charcoal briquettes, are small kilns which typically produce less than 20 tons of charcoal over a 3-week cycle. In contrast, continuous hearth units produce an average of 2 to 3 tons of charcoal per hour.

In blast furnace applications the charcoal to iron ratio is approximately 0.6 tons charcoal to one ton iron. Therefore, an annual mill production of 375,000 tons of iron requires approximately 225,000 tons of charcoal. Satisfying this need with the prior art batch kilns having a best case annual yield of 350 tons, would require more than 640 kilns. Similarly, satisfying the demand with continuous hearth units, each producing 16,500 tons of charcoal annually at a 75% duty cycle, requires 14 kilns.

Apart from considerations on the per unit time volume of charcoal produced, there is also concern with regard to disposal of the toxic gas discharges produced by pyrolysis. During the manufacturing process the wood is heated, driving off water and highly volatile organic compounds (VOC). The wood temperature rises to approximately 275° C. (527° F.) and the VOC distillate increases. At this point, external heat is no longer required because the carbonization reactions become exothermic. At 350° C. (662° F.), exothermic pyrolysis ends, and heat is again applied to remove the less volatile tarry material byproducts from the product charcoal.

The byproducts include noncondensible gases (carbon monoxide [CO], carbon dioxide [$CO_2$}, methane, and ethane), pyroacids (primarily acetic acid and methanol), tars and heavy oils, and water. All of these are emitted with the kiln exhaust and emission controls combust the organic compounds (ethane, methane, ethanol, and polycyclic organic mailer (POM)) and CO to $CO_2$ and water before emitting it to the atmosphere.

Continuous production of charcoal is more amenable to emission control than batch production because emission composition and flow rate are relatively constant, and emissions may be controlled with afterburners. Control of emissions from batch kilns is difficult because the process and emissions are cyclic, with the emission composition and flow rate changing over the process cycle. Batch kilns do not typically have emission control devices.

There is therefore, a present need for a process and apparatus capable of producing higher volumes of charcoal per unit time, and at lower unit cost, while also providing effective emission control of the toxic constituents of the production process.

DISCLOSURE OF INVENTION

One object of the present invention is to provide a method and apparatus for producing higher units of charcoal yield per unit of time. Another object of the present invention is to a method and apparatus which reduces the unit cost of producing charcoal for use in industrial applications. Still another object of the present invention is to provide a method and apparatus capable of producing charcoal with minimal discharge of the toxic constituents of the production process into the environment.

According to one aspect of the present invention, charcoal is produced in batch process cycles having an endothermic or drying phase, an exothermic or pyrolysis phase, and a cooling phase, and which is performed concurrently in each of a plurality of kilns (or retorts); each kiln being supplied with a woody raw material charge which is subjected to forced hot process gas and cooled process gas convection within the kiln to reduce the interval times of the endothermic and cooling phases, thereby reducing the overall production cycle time. In further accord with this aspect of the invention, the forced hot process gas and cooled process gas convection of the charge within each kiln is provided by one or more gas handlers associated with the kiln.

According to another aspect of the invention the kilns are supplied with heating hot process gas from an external combustor during the endothermic phase, the hot process gas being recirculated between the combustor and each kiln through enclosed supply and return ducts, thereby reducing sacrificial consumption of the charge itself and increasing charcoal yield. In further accord with this aspect of the invention, the pyrolysis phase off-gases discharged from the kilns are returned to the combustor and consumed as fuel to produce the combusted hot process gas, whereby the hot process gas supplied to the kilns are essentially free of volatile organic compounds (VOC) and the opportunity for discharge of VOCs to the atmosphere are minimized. In still further accord with this aspect of the invention, the batch processes performed in the kilns are performed in an ordered sequence in which a balance may be achieved between the collective volume of pyrolysis phase discharged gases flowing through the return duct is sufficient to fuel the combustor as necessary to provide the heating load demand of the kilns that are in the endothermic phase, thereby achieving system equilibrium.

The present invention significantly reduces the cycle time necessary to produce charcoal, thereby allowing for a higher volume of charcoal per unit time, as necessary to satisfy the scheduled fuel demands of industrial applications. The use of an external combustor minimizes sacrificial consumption of the woody material charge during pyrolysis so as to produce a higher charcoal per unit of raw material yield. In addition, the hot process gas supply ducts and the kiln subassembly are oxygen free, and the positive pressure within the supply and return ducts flush the combustible VOC gases from the kiln, further minimizing opportunity for combustion within the kiln. All of which produces both a higher ratio yield of charcoal to raw charge and a higher overall volume charcoal per unit time to ensure a lower unit cost of production over the prior art methods and apparatus.

These and other objects, features, and advantages of the present invention will become more apparent in light of the following detailed description of a best mode embodiment thereof, as illustrated in the accompanying Drawing.

BEST MODE FOR CARRYING OUT THE INVENTION

The present invention is to a method and apparatus for producing charcoal in a high volume batch process. The process is performed in individual kilns which share a common external combustor, and whose primary source of fuel are the VOC wood gases produced by the exothermic, or pyrolysis phase of each kiln's batch cycle. In the best mode embodiment the kilns perform their processes in a relative ordered sequence intended to provide a continuing supply of wood gases to satisfy the endothermic phase heat demand of the kilns with the pyrolysis wood gases produced by those kilns in their exothermic phase. This provides a system energy balance and minimizes the need for supplementary fuels.

While the number of kilns in a given system configuration is principally a function of the production demand and throughput (batch process volume) placed in the system, which can be scaled within limits, the invention's best mode embodiment limits the minimum and maximum number of kilns to be supplied from the common combustor. The maximum number is limited by practical constraints on the physical size of the combustor and of the gas ducts necessary to satisfy the system's heat load with the associated distribution heat losses. The minimum number of kilns is determined by the requirement of having a sufficient on-going volume of pyrolysis gases to satisfy the endothermic phases heating demands. This in turn depends on the kiln turn-around time, i.e. the interval times required to unload the charcoal product and to load a new raw material charge, and the moisture content of the raw wood used in the charge.

As described in greater detail hereinafter, for an assumed loading time interval of two hours, an unloading interval of one hour, and a maximum wood moisture content of 35% (dry basis), a minimum of nine kilns is considered necessary to produce a sufficient wood gas caloric content to satisfy the system's endothermic phase heating demand. If the wood moisture exceeds 40% (dry basis) supplementary fuel may be necessary.

In addition to specifying a minimum and maximum number of kilns per system, the best mode embodiment requires that the kilns be placed in a reasonably balanced array around the combustor, and in as close a physical proximity as allowed by site conditions to minimize the maximum run length and duct sizes of the hot process gas distribution network, while providing substantially equal kiln heating. Preferably, therefore, the kilns are arranged in groups which are arrayed in a reasonable symmetry with respect to the combustor. A kiln group is commonly referred to as a battery. Ideally the batteries have balanced numbers of kilns, but where a system comprises an uneven number of kilns an imbalance of one kiln is acceptable.

Figure 1:
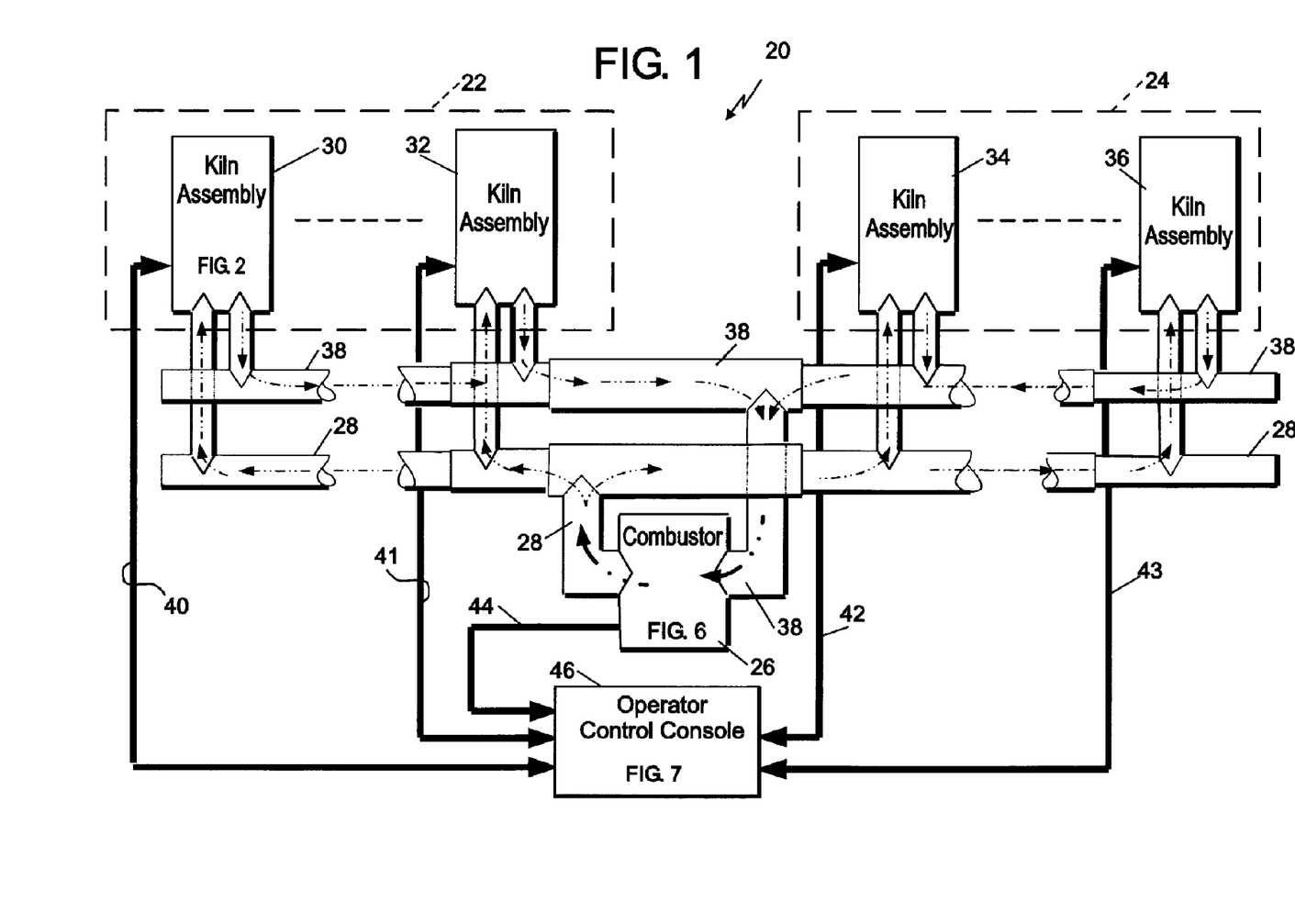
FIG. 1 is a system block diagram of a best mode embodiment of an exemplary configuration of a charcoal production system according to the present invention.

Referring now to FIG. 1, in a best mode embodiment of an exemplary configuration of a charcoal manufacturing system 20, the system 20 includes twin kiln assembly batteries 22, 24 and a central combustor 26. The combustor provides high temperature hot process gases, or simply "hot process gases", through a supply duct 28 to kiln assemblies 30, 32 of battery 22 and kiln assemblies 34, 36 of battery 24. The hot process gases are forced through the kiln assemblies and together with the waste gases produced in the batch process are recycled to the combustor 26 through return duct 38. In the best mode embodiment of the system 20 the kiln assemblies 30, 32, 34 and 36 are each also connected through lines 40 through 43 to a central Operator Control Console 46. As described below in detail with respect to FIG. 2, the several phases of the batch process performed by each of the kiln assemblies are controlled from the Operator Control Console 46.

Figure 2:
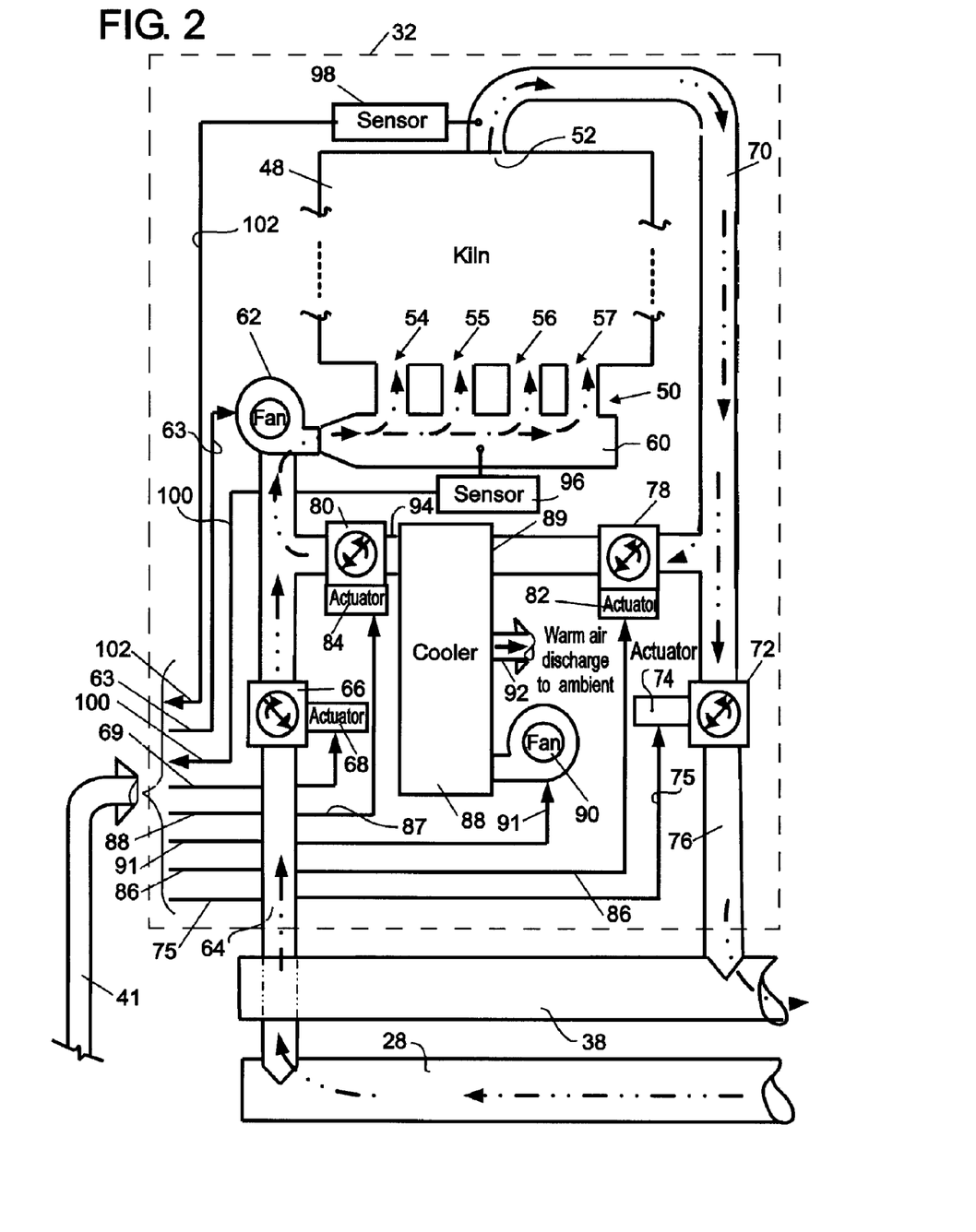
FIG. 2 is a schematic diagram of a best mode embodiment of a kiln assembly, as used in the embodiment of FIG. 1.

In the best mode embodiment of system 20 the kiln assemblies 32, 32, 34, and 36 have a common configuration, as shown in a schematic diagram of the kiln assembly 32 in FIG. 2. Referring to FIG. 2, the kiln assembly 32 includes a kiln structure 48 which houses the raw material charge, or simply "source material", and within which the batch process is performed. The kiln structure 48 receives the hot process gases from the combustor 26 (FIG. 1) at a kiln structure inlet 50, and discharges the process waste gases at a kiln structure outlet 52 following their convection through the source material. In the best mode embodiment the kiln structure inlet 50 includes a plurality of inlet ports 54-57 to provide a more uniform distribution of the hot process gas flow into the kiln and through the source material.

The kiln structure inlet ports 54-57 receive the hot process gases from a manifold 60. A gas handler 62, such as a recirculation fan, or equivalent, forces the hot process gases under pressure through the manifold 60 and inlet ports 54-57 into an open lower level area of the kiln, below the wood charge. The gas handler 62 is control actuated by command signals received through lines 63 and 41 from the Control Console (46, FIG. 1). The fan 62 is a known type recirculation blower, such as the Model 48×13.125 type AF 1039 Class IV blower manufactured by Robinson Industries, Inc. The fan 62 is sized to provide an "open-area" flow velocity of about one foot per second (1 ft/sec.). The open area flow velocity is not the actual velocity of the gas entering the kiln's open lower level area, but is a design parameter used to size the fan. It assumes that there is no wood charge in the kiln and that the gas flows through the kiln substantially unimpeded.

The hot process gas supply from the combustor 26 (FIG. 1) is provided through the supply duct 28 to the receiving duct 64 of the kiln assembly 32. Control valve 66 within the duct 64 controls the flow of the hot process gases to the fan 62. The valve 66 is a known type wafer butterfly valve which provides on/off ("gate") flow control of the hot process gases to the fan 62 in response to activation by actuator 68. Actuator 68 is itself control actuated by command signals received through lines 69 and 41 from the Operator Control Console (46, FIG. 1). The actuator 68 is a known type electric motor actuator, such as the model EM840-72 manufactured by the Bettis Corporation, Waller, Tex., a subsidiary of Emerson Process Management.

In operation, the valve 66 is opened to permit hot process gas to flow into the kiln during the endothermic and exothermic phases of the batch process. In the endothermic phase the hot process gases dry the wood charge and initiate pyrolysis. During the exothermic phase they provide a positive gas flow to flush the VOC gases from the kiln chamber and return them to the combustor 26 (FIG. 1). The valve is closed at all other times, including during the cooling phase, the loading and unloading phases, and the initial start-up of fan 62.

With the valve 66 opened, and with the forced convection of fan 62, the hot process gases flow into the lower level of the kiln 48 and upward through the source material charge, thereby drying and heating the wood. Following convection through the wood the waste gases are discharged from kiln structure outlet 52 and flow through exhaust duct 70 to control valve 72. Valve 72 is functionally similar to valve 66, and it is actuated by actuator 74, which is functionally similar to actuator 68. Actuator 74 is control actuated by command signals received through line 75 and 41 from the Control Console (46, FIG. 1). Valve 72 is gated (opened/closed) substantially in phase with valve 66 to allow the discharged waste gases to flow from the exhaust duct 70 to the kiln assembly's discharge duct 76 where they are re-circulated to the combustor.

At the completion of the kiln cycle's exothermic phase, with pyrolysis complete, the cycle's cooling phase begins. Actuators 68, 74 are commanded to close valves 66, 72, thereby isolating the kiln assembly 32 from the hot process gas flow. Forced convective cooling of the charcoal then begins with the opening of valves 78, 80 by their associated actuators 82, 84, which are control actuated through lines 86, 87 from the Control Console (46, FIG. 1). With the valves 78, 80 opened and valves 66, 72 closed, the gas handler 62 draws the kiln's discharged gases from the exhaust duct 70 through cooler 88. The cooler 88, or heat exchanger, is a known type waste gas cooler, such as that available from the Thermal Transfer Corporation of Duquesne, Pa. In the best mode embodiment it is preferably a vertical gas cooler, having an internal cylindrical tube and sheet baffle which is designed to operate in counter flow.

The cooler 88 receives the hot discharged gases at gas inlet 89, where they pass through an inlet plenum and are circulated downward through the tubes of the internal baffle while cooling air flow is forced upward by fan 90, around the baffle and outside of the tubes. The fan, which is control actuated through line 91 from the Control Console (46, FIG. 1), is a known type, such as the Model 49×14.8125 Class IV air blower manufactured by Robinson Industries, Inc. Zelienople, Pa. The heated ambient air is exhausted from the cooler at port 92 and the cooled discharge gases exit at gas outlet 94.

As described above, the kiln assembly 32 comprises the kiln structure 48, with its kiln structure inlet 50 and kiln structure outlet 52, together with those external elements which support its operation. These support elements are collectively referred to as kiln support means. The kiln support means includes control valves 66, 72 and actuators 68, 74, which control presentation of the hot process gases to the kiln structure and are collectively referred to here as heating mode apparatus, and further includes heat exchanger 88, associated fan 90, control valves 78, 80 and actuators 82, 84, which control application of the cooled process gases to the kiln structure are collectively referred to here as cooling mode apparatus. The fan 62 and sensors 96, 98 are common to both the heating mode and cooling mode apparatus.

As described hereinafter with respect to FIG. 8, the batch process performed by the system 20 has five phases, including: (a) a loading phase during which the source material charge is loaded into the kiln structure, (b) a drying phase in which the kiln structure applies hot process gases to the source materials to remove its moisture, (c) a pyrolysis phase which converts the source material to charcoal in an exothermic reaction which produces volatile waste gases, (d) a cooling phase in which the kiln structure applies cooled process gases to the charcoal to reduce its temperature below that which supports combustion when the charcoal is exposed to ambient air, and (e) an unloading phase during which the finished charcoal is removed from the kiln structure.

In the best mode embodiment of the system 20, the five batch process phases are performed by the kiln assembly 31 in three operational states, including: (a) a quiet mode in which the kiln assembly is inactive, (b) a heating mode which applies hot process gases to the source material, and (c) a cooling mode which applies cooled process gases to the charcoal to reduce its temperature. As may be apparent, the kiln assembly is in the inactive mode during the batch process loading and unloading phases, when no process gases are applied to the kiln structure. As may also be apparent the kiln assembly is in the heating mode when applying hot process gases to the source material during the drying phase and in the cooling mode when applying cooled process gases during the cooling phase. In a less apparent, but highly practical application, the kiln assembly also operates in the heating mode during the pyrolysis phase. While the pyrolysis phase generates its own heat, the continued application of the hot process gases to the kiln structure provides the necessary positive pressure conditions to force the exothermic phase waste gases back to the combustor.

The instant operating state of the kiln assembly is determined by command signals provided by the Control Console on the lines 63, 69, 75, 86, 88, and 91 to the kiln support means. The control algorithm provides for the control valves 66, 72, 78, 80 to be closed during the inactive state to prevent any process gas flow through the kiln structure during the loading and unloading phases, and at all other times that the kiln assembly is inactive. This also establishes a starting point for the active operating modes. The control algorithm provides for a heating mode command signal which opens control valves 66, 74 and closes valves 78, 80 to cause hot process gases to flow from the supply header 28 (FIG. 1) to the kiln structure and the waste gases discharged at the kiln structure outlet to recycle to the return header 38. The control algorithm also provides for a cooling mode command signal which closes valves 66, 74 and open valves 78, 80 to remove the hot process gas flow and to cause the discharged waste gases from the kiln structure outlet to circulate through the heat exchanger 88 to be cooled and forwarded to gas exchanger 62 as cooled process gases.

As will become more apparent from the process description to follow, the endothermic, exothermic, and cooling phases of the batch process have established time intervals that are determined by the size and geometry of the kilns, and by the size and moisture content of the charge held by the kiln 48. This allows the control of the kiln assembly actuators and valves to be accomplished on a time event basis. It is, however, still important to know the instantaneous temperature of the gases at the inlet 50 and outlet 52 of the kiln subassembly to determine the progress of the charcoalization and cooling, and also for select events, such as at startup of a kiln assembly at the beginning of its batch cycle and for start-up of the overall system itself. In these instances the sensed temperatures can be correlated to system stability and/or operability and used to determine the start point for initial actuation of the assembly's control valves.

In the best mode embodiment thermocouple sensors 96, 98 sense the inlet and outlet gas temperatures, respectively, and provide their respective sensed temperature signals on lines 100, 102 to the central console at the system's Control Console. The thermocouples are of a known type, such as the Model D5767-S-18 Type S assembly available from the Marlin Manufacturing Corporation. The sensed inlet and outlet gas temperature sensors of each kiln also function as monitors of the overall system performance, since normal inlet and outlet temperatures cannot be achieved without proper hot process gas flows and proper sealing of the kilns. The sensor lines 100, 102, together with the control lines 63, 69, 75, 86, 88 and 91 are all bundled within the line 41 and routed back to the system Control Console (46, FIG. 1).

Figure 3:
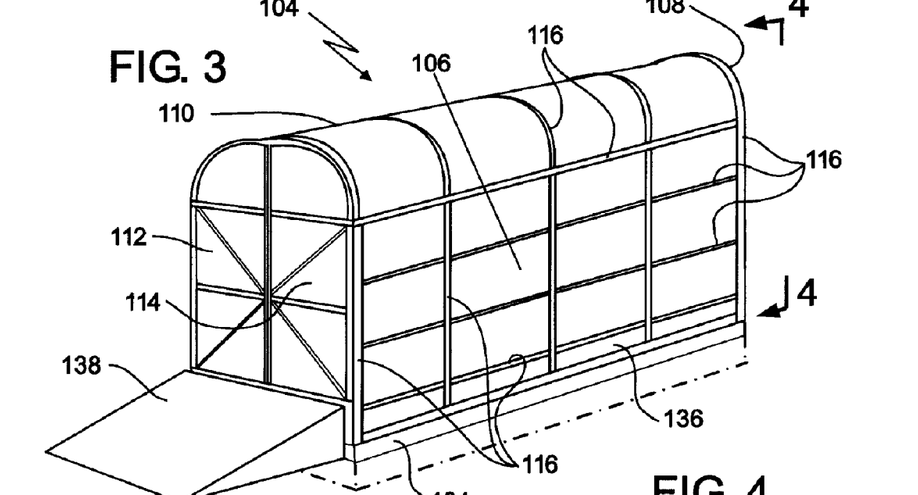
FIG. 3 is a perspective illustration of a kiln structure, as used in the embodiment of FIG. 2.

FIG. 3 is a perspective illustration of a representative physical embodiment of the kiln 48, shown schematically in FIG. 2. In a best mode embodiment, the kiln 48 comprises an enclosed rectangular steel kiln structure 104 with side and end walls 106, 108, a roof 110, which is preferably arched to provide clearance for the equipment used to load and unload the kiln, and a pair of hinged access doors 112, 114. The side and end walls 106, 108 are double wall steel plate assemblies which are mounted to the kiln's structural steel framing members, or ribs 116.

Figure 10:
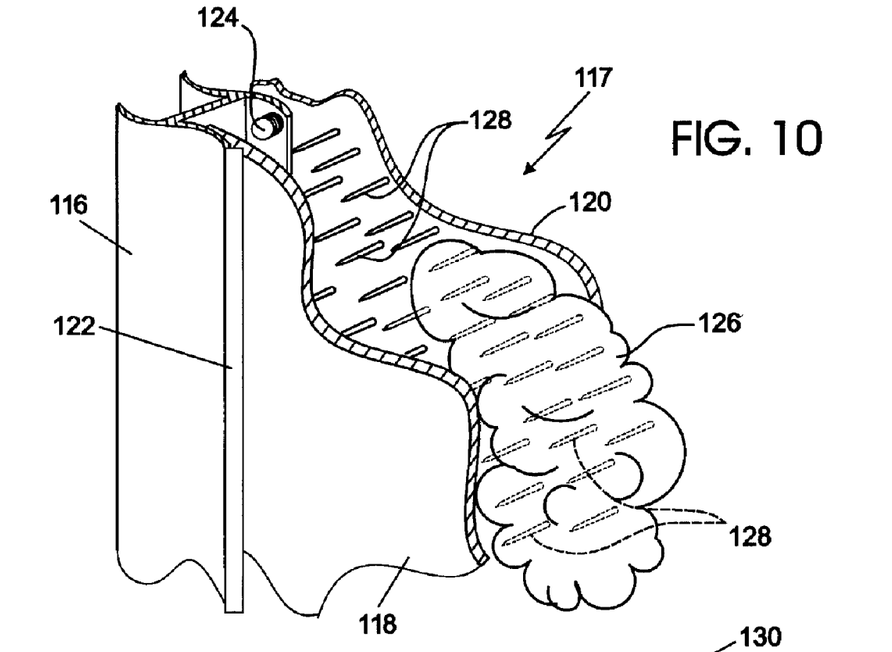
FIG. 10 is a broken away, perspective illustration of another feature of the kiln structure of FIG. 3.

FIG. 10 is a perspective illustration of a partial wall section 117 that is representative of the side and end wall structures 106, 108. These structures include outer and inner steel plate "skins" 118, 120. In a best mode embodiment, the outer steel plate is nominally 3/16 inch thick, four (4) meter long plate that is welded to each of its abutting plates as well as to the kiln framing members 116, as shown by weld 122, to seal the toxic VOC gases within the kiln and to prevent air infiltration into the kiln structure. The inner plate is nominally ¼ inch thick, four (4) meter long plate and is preferably bolted to the members 116, as shown by bolt 124, to allow for thermal expansion.

The interior space between the inner and outer steel plates 118, 120 is filled with insulating material 126, which thermally insulates the kiln interior to minimize thermal loss. Preferably, the insulating material is known type ceramic fiber, such as the KAOWOOL brand manufactured by Thermal Ceramics Inc. The insulated double steel plate design is capable of withstanding temperatures of up to 1200 degree centigrade. The fiber is held in position within the walls by rows of small steel pins, or "stickers" 128 which penetrate and support the fiber. The stickers are made of ten (10) gauge steel, and are welded at their base to the wall facing surface of the inner steel plate 120, in a row and column array. The stickers are approximately 225 millimeter (mm) long (about 9 inches) and are spaced along the inner plate surface with approximate 300 mm on center spacing.

Figure 11:
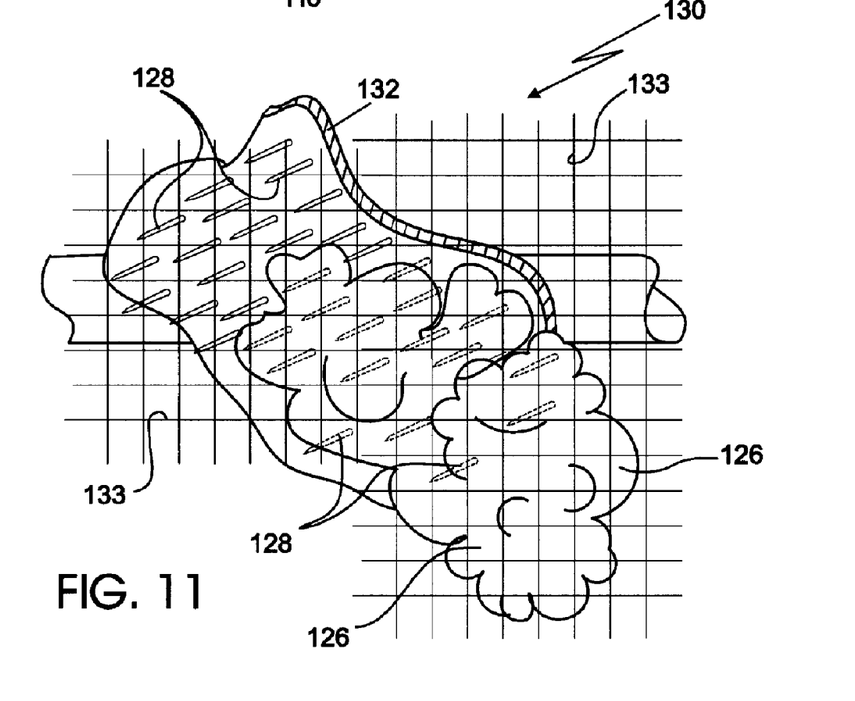
FIG. 11 is a broken away, perspective illustration of still another feature of the kiln structure of FIG. 3.

The arched roof 110 of the kiln is a single layer steel structure. FIG. 11 is a perspective illustration of a partial section 130 of the interior of the kiln roof. 110. The roof has an outer carbon steel plate 132 that is welded (weld not shown in FIG. 11) to the framing member 116 to seal the toxic VOC wood gases within the kiln. The inside surface of the steel plate 132 is also covered with the ceramic insulating fiber 126 which is held in place by stickers 128 that are welded along the inner surface of the plate 132. Since the roof 110 is a single layer steel plate structure, the fiber 126 is held in place by a wire mesh 133 which is attached to the inner surface of the plate 132.

Figure 3A:
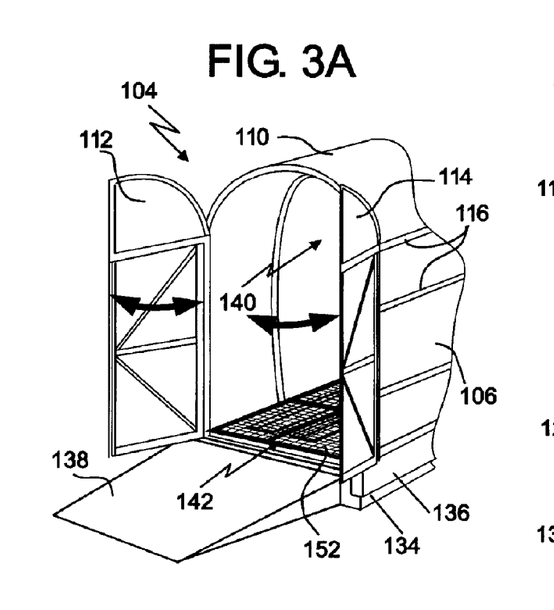
FIG. 3A is sectioned perspective of the kiln structure of FIG. 3.

Referring again to FIG. 3, the kiln structure 104 is raised above the ground by the height of the kiln's foundation 134, together with the height of the kiln's lower level section 136, where the kiln structure inlet ports 54-57 are located. This is shown in greater detail in FIGS. 4 and 5. To accommodate the elevation a ramp 138 is used to permit access to the interior of the kiln by powered equipment that may be used to load the charge and unload the finished charcoal. FIG. 3A is a perspective illustration of the kiln's front end with the doors 112, 114 open.

As with the roof 110, the doors 112, 114 are single layered steel plate. Although not shown in FIG. 3A for illustration clarity, the doors too have ceramic fiber insulation installed on their inner surface using stickers welded to the door inside surfaces, and wire mesh to secure the ceramic fiber to the interior surfaces of the doors. The stickers are mounted to the door interior surface in the same manner and with the same spacing as provided for in the walls and ceiling. As shown, the ramp 138 provides access to the kiln interior 140 and facilitates the loading of the kiln charge, which in the exemplary embodiment is placed directly onto the open grating floor 142. The open grating floor 142, which is positioned directly above the kiln's lower level section 136, provides the hot process gases entering the lower level substantially unobstructed access to the charge.

Figure 4:
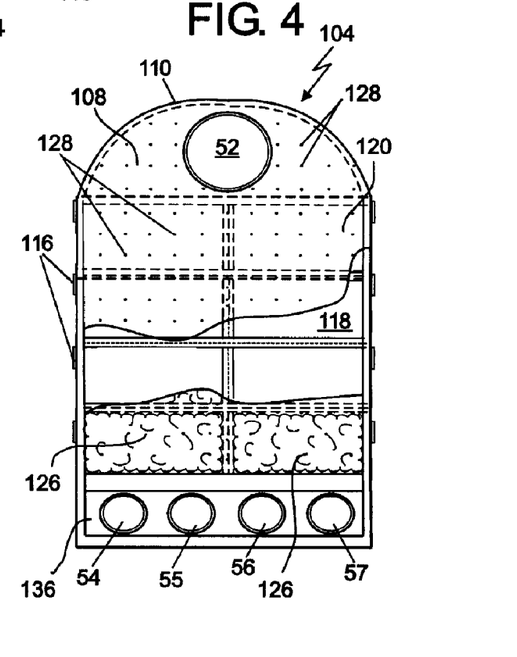
FIG. 4 is an elevation taken along the line 4-4 of FIG. 3.

FIG. 4 is an elevation of the back wall taken along the line 4-4 of FIG. 3. The outer steel plate 118 is partially broken away to show the stickers 128 welded to the inner plate 120. Again, for illustration clarity, the ceramic fiber 126 (FIG. 10) is only shown in the bottom breakaway portion of the kiln. It is understood, however, that the insulating ceramic fiber is installed along the full rear wall 108 with the exception of the wall of lower level section 136 and the inlet ports 54-57 and outlet port 52.

Figures 5, 5A:
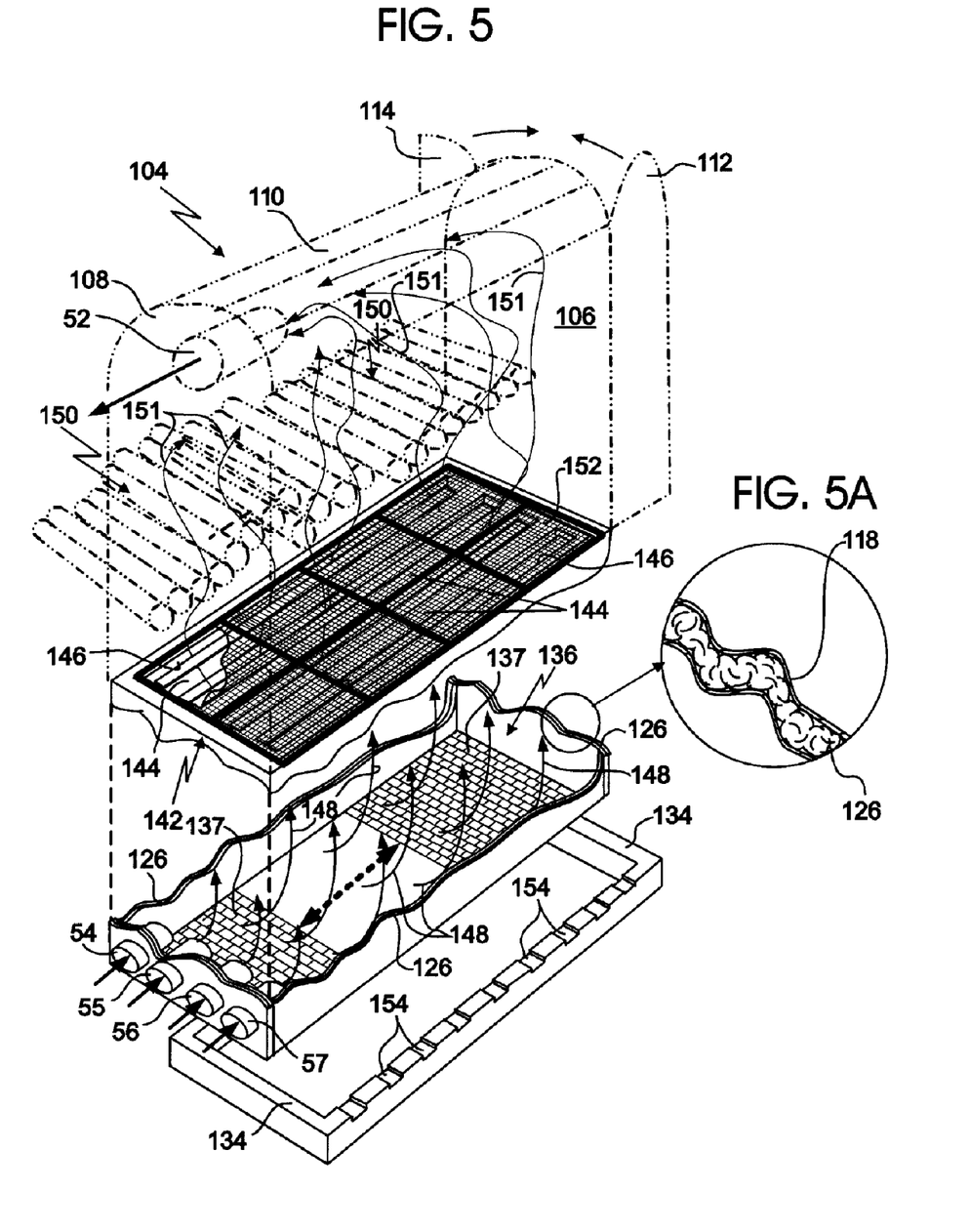
FIG. 5 is a broken away perspective illustration, partially in phantom, of the kiln structure of FIG. 3.
FIG. 5A is an enlarged sectional view of one element of FIG. 5.

FIG. 5 is a blown apart, perspective illustration, partially broken away and partially in phantom, of the structure 104 of kiln subassembly 48, as viewed from a rear quarter of the structure 104. The portion of the kiln which houses the wood charge is shown in phantom to illustrate the kiln's interior features. The phantom sections include the roof 110, side wall 106, the access doors 112, 114, the rear wall 108, and the kiln structure outlet 52. The kiln's lower level section 136, foundation 134, and floor assembly 142 are shown in a broken away, solid line illustration. The floor 137 of the lower level section 136 is lined with refractory material. In the best mode embodiment, the refractory material is in the form of bricks that are placed on a steel shell plate that forms the bottom closure of the structure 104 and which rests on the foundation 134 in the assembled structure.

The floor assembly 142 comprises a plurality of steel beams 144, preferably carbon steel I beams which extend the length of the kiln. The beams 44 are spaced apart to provide a flow path for the hot process gases 148 entering the lower level 136 to flow upward through the woody material charge 150 that is stacked in the kiln's main enclosure. The interaction of the hot process gases 148 with the charge produces exhaust gases 151 which exit the kiln through outlet port 52.

In the best mode embodiment, a floor grating 152 is placed across the floor beams 144, and it extends substantially the length and width of the floor assembly 142. Preferably, for ease of maintenance, the grating 152 is provided in sectional panels which can be readily removed for access to the lower level 136. The grating grid size is selectable. It should be small enough to prevent significant amounts of small sized charge materials or finished charcoal from falling into the lower level area, but large enough so that it does not materially impede the flow of the hot process gases 148 from the lower level through the charge. A preferred grating size is 90 mm×10 mm.

The charge 150, which in FIG. 5 is shown in phantom as comprising wooden logs, are also shown placed in a substantially transverse orientation to the beams 144. The placement and orientation of the charge within the kiln structure 104 is determined by the operator based upon the type of source material so as to maximize the process efficiency. With logs, they can be placed longitudinally, in several unit piles, such as three end-to-end piles of six meter long logs, or four piles of logs which are four and a half meters long, or even six piles of three meter length logs. The preferred type and sizes of woody materials to be used for the charge is described in greater detail hereinafter with respect to FIG. 7 and the description of the batch process cycle.

In the best mode embodiment the foundation 134 is concrete, with a 4000 pounds per square inch (psi) rating, or such suitable alternative material as may be known to those skilled in the art. The foundation supports the full weight of the kiln structure 104, which is transmitted to the foundation through the kiln structure ribs 116 (FIG. 3). A plurality of ducts or depressions 154 are formed in the foundation's top surface to provide air circulation beneath the kiln for cooling. These ducts also prevent surface water that accumulates within the foundation from reaching the height of the floor 137 of the lower level 136.

Figure 6:
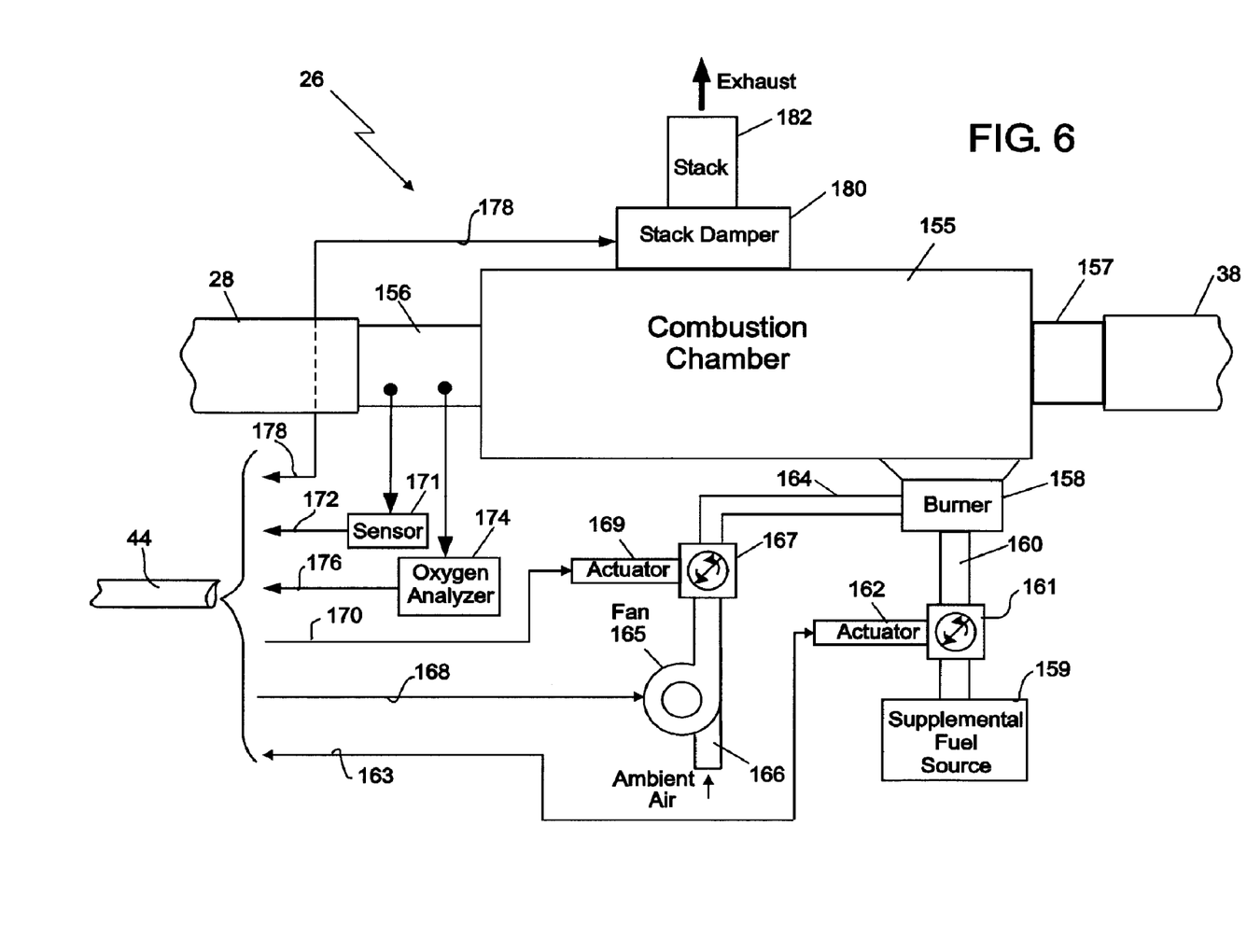
FIG. 6 is a schematic diagram of a combustor, as used in the embodiment of FIG. 1.

Referring now to FIG. 6, which is a block diagram of the combustor 26 of FIG. 1. The combustor 26 includes a combustion chamber 155, which is connected at its outlet port 156 to the hot process gas supply header 28 and is connected at its inlet port 157 to the return header 38 (FIG. 1). The combustion chamber 155 is a refractory lined, custom designed chamber capable of providing good mixing of the VOC gases as well as proper combustion and temperature control of the combusted gas discharge. There is no burner for the VOC gases. The VOC gases are simply ducted to the chamber of the combustor where they are mixed with free oxygen and combust when they come into contact with a flame source.

A burner 158, shown in phantom, provides the flame source for combusting the VOC gases as well as burning other type fuels, as necessary to supplement the available VOC caloric energy under certain exceptions to normal operating conditions. These exceptions include having a source material moisture content which exceeds 40%, and when there is an insufficient volume of VOC gases produced due to having less than a full compliment of system kilns operational. Although a fluid type supplemental fuel, such as number two oil or propane, is preferred for their ease of use, any alternative type fuels known to be suitable by those skilled in the art may be used.

In FIG. 6 a supplementary fuel source 159 provides fuel through a supply line 160 and control valve 161 to the burner 158. The control valve 161 is a known type butterfly valve similar to those used to control gas flows in the kiln assemblies. Actuator 162 controls the butterfly position of the valve 162 to modulate the supplementary fuel flow to the burner 158 as needed. The actuator 162 is similar to those used to actuate the gas flow valves in the kiln assemblies and is itself control actuated by command signals provided on line 163 and lines 44 from the Control Console (46, FIG. 1).

The burner 158 receives combustion air from the combustor's ambient surroundings through duct 164, as drawn in by a combustion air fan 165 from duct 166. The volume of air is modulated by control valve 167, as necessary to control burner performance. The fan 165 is a known type blower and its performance specifications, including flow volume, are determined by the combustor's design parameters and the type of supplemental fuel used; all of which is known to those skilled in the art. The fan is actuated by command signals presented to it through lines 168 and 44 from the Control Console (46, FIG. 1). The control valve 167 is a known type butterfly valve, similar to valve 161 and to those used to control gas flows in the kiln assemblies. Valve 167 is position controlled by actuator 169 to modulate the volume of the ambient air intake as necessary to satisfy combustion requirements. Actuator 169 is similar to actuator 162 and to those used to control the gas flow valves in the kiln assemblies. Actuator 169 is itself control actuated by command signals presented to it on lines 170 and 44 from the Control Console (46, FIG. 1).

In the operation of the combustion chamber 155 there are three performance parameters that are controlled. These include: (1) the temperature of the hot process gas discharge, (2) the combustible content of the gas discharge, and (3) the combustor internal pressure. The combustor's hot process gas discharge to the kilns is controlled to a nominal 375° C. (707° F.) at the outlet port 156. The 375° C. (707° F.) set point value is a nominal elected value which is selected to ensure hot process gas temperatures in excess of 350° C. (662° F.) despite such heat losses as may exist in the supply header 28. Therefore, the minimum discharge temperature should be at least 350° C., and preferably 375° C. The actual discharged gas temperature is measured by sensor 171 which provides a sensed discharge gas temperature signal on line 172 and through line 44 to the Control Console (46, FIG. 1). In the best mode embodiment the sensor 171 is a known type thermocouple, such as the Model D5767-S-18 Type S assembly from the Marlin Manufacturing Corporation, however, it should be understood that other types of temperature sensing devices as are known to those skilled in the art to be suitable for the application may be used.

To limit the opportunity for combustion of the hot charcoal product during the kiln's cooling phase, the free oxygen content of the hot process gases supplied to the kilns is minimized; substantially to zero. In the best mode embodiment this is achieved in a two step process. The first step is to operate the combustion chamber 155 under sub-stoichiometric conditions. Under ideal stoichiometric fuel/air mixture conditions both the fuel and the oxygen in the air mixture are completely consumed. However, due to control tolerances and/or the desire to ensure complete combustion, the air content may be higher than necessary resulting in a residual free oxygen content in the hot process gas discharge. The second step monitors the combusted gas discharge to detect the instantaneous combustibles level and adjusts the fuel/air mixture ratio accordingly to provide a more or less proportional amount of residual combustibles in the discharge.

The instant oxygen content is detected by an oxygen analyzer 174, which is a known type, such as the Ametek model WDG-HPII Flue Gas Oxygen Analyzer, or equivalent, and which provides a sensed oxygen signal representative of the free oxygen in the stream on lines 176 and 44 to the Control Console (46, FIG. 1). The system control algorithm, in response to the sensed oxygen signal, then adjusts the combustor's fuel/air ratio to maintain a certain level of combustible content in the gas. The nominal combustible content range is about two to three percent (2%-3%). This a nominal preferred percentage range, which may otherwise extend from about one percent up to about five percent (1%-5%). The actual percentage within the range is determined by the magnitude of the sensed oxygen signal, which is scaled and weighted by the control algorithm to provide a suitable response time for positioning the butterfly of the valve 167 to achieve the necessary fuel/air ratio set point.

Similarly, the control algorithm uses the combustible's level value together with the actual discharged gas temperature to determine the necessary flow volume of combusted gases to the kiln, and whether or not supplemental heating is needed. If supplemental heating is required the control algorithm causes the Control Console to provide an actuation signal on line 163 to actuator 162, which opens valve 161 and draws fuel from source 159.

The pressure magnitude of the combusted gases in the combustion chamber is also controlled to maintain a slightly positive pressure within the combustion chamber to minimize outside air infiltration. In the best mode embodiment the nominal pressure set point is about 25 mm w.c. To accomplish this, a pressure controlled damper 180, in response to an actuation signal on line 178 from the Control Console, is actuated to balance the inflows and outflows of the combustion chamber. The actuation signal is provided by the Control Console in response to a sensed pressure signal from a pressure sensor and transmitter (not shown). The flow damper is then actuated to vent the waste gas through the stack 182.

The requirement for supplemental heating adds further control complexity. There are two fuels being consumed; the re-circulated VOC gases and the supplemental fuel. While the supplemental fuel flow is metered by control valve 161, the available VOC gases depend on the number of kilns that are simultaneously in the pyrolysis phase, and how far along each them are in that phase. The system's determination of the sufficiency of the volume of the return VOC gases is made through the gas discharge temperature. It is likely that with ten kilns at least three will be in the pyrolysis phase simultaneously so as to provide an approximate steady average supply of VOC gas to the combustor.

Figure 7:
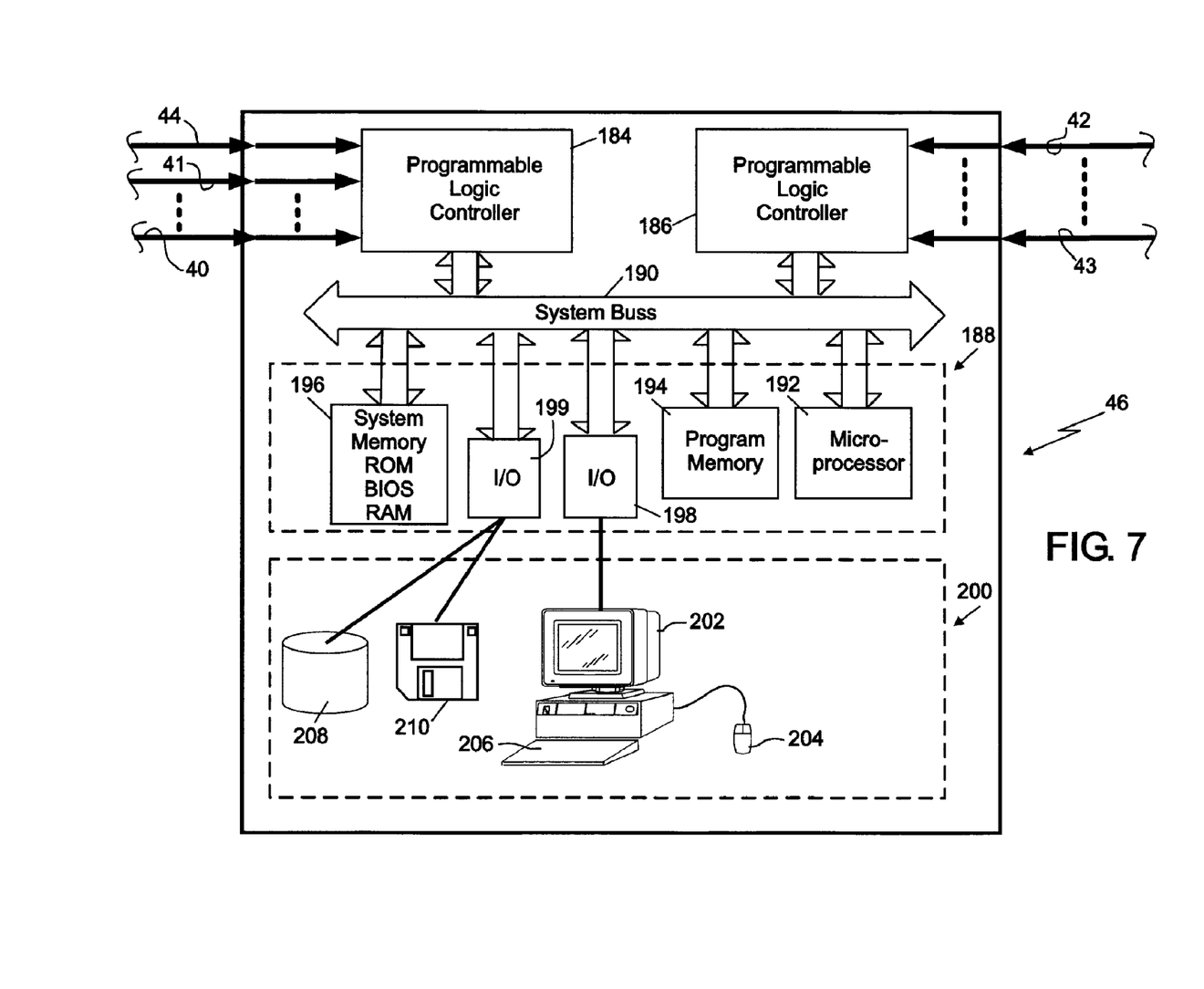
FIG. 7 is a schematic diagram of an Operator Control Console, as used in the embodiment of FIG. 1.

Referring now to FIG. 7, which is a block diagram schematic of the operator console 46. The control architecture for the system 20 (FIG. 1) is that known for use with industrial networks, such as the DeviceNet™ and ControlNet™ industrial networks based on the Control and Information Protocol (CIP). The network has a three level hierarchy, including a device level, a control level, and an information level. The device level includes the input/output (I/O) devices associated with the individual system apparatus to be controlled among the kiln assemblies 30-36 (FIG. 1), such as the fans 62, 90 and control valve actuators 68, 74, 82, 84 of the kiln subassembly 48 (FIG. 2), as well as the sensors 96, 98 which sense the actual gas temperatures at the kiln subassembly inlet and outlet ports 50, 52. The device level I/Os also include interfaces to the valve actuators 162, 169, as well as fan 165 and stack damper 180, and receive the sensed discharge temperature and sensed oxygen content signals on lines 172, and 176 (FIG. 6).

The I/O devices at this level communicate through lines 40-44 with the control level devices at the Control Console 46, using the CIP or other known network protocol. The control level devices comprise network controllers 184, 186, which are known type programmable logic controllers (PLCs), such as the CONTROLLOGIX model line of PLCs manufactured by Allen Bradley, or equivalent. The PLCs communicate with the information level host computer 188 through a system buss 190. The host computer includes a microprocessor 192, such as the PENTIUM Model III signal processor manufactured by the Intel Corporation, a random access memory (RAM) 194 for storing the system's application and operating system software, a read only memory (ROM) 196 for storing system data, and I/O devices 198, 199 which provide the communication interface between the host computer and the graphic user interface (GUI) 200 used by the system operator.

The GUI is a known type operator interface, having a personal computer 202 with mouse 204 and keyboard 206 responsive to manipulation by a human operator, and having external mass storage devices, such as a hard drive 208 and portable disk 210. In the best mode embodiment the operating system software is InTouch Wonderware, version 8.0 for HMI (Human Machine Interface) applications., which is provided by the Wonderware Corporation, Lake Forest, Calif.

Figure 8:
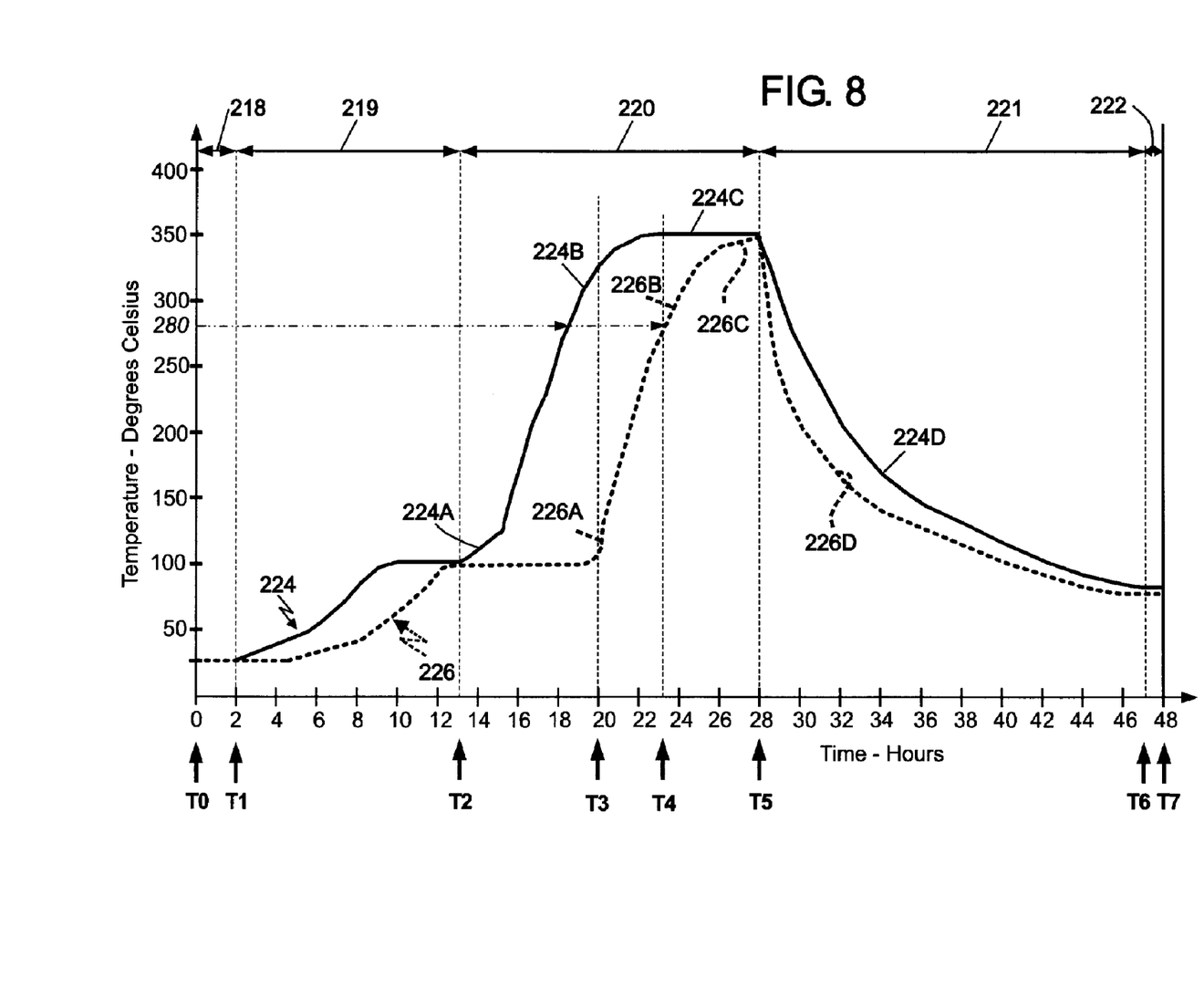
FIG. 8 is a waveform illustration of a time-temperature transfer function as used in the description of operation of the embodiment of FIG. 1.

FIG. 8 is a waveform illustration of the time-temperature cycle of the batch process performed in each of the kiln assemblies 30-36 of FIG. 1. The ordinate represents the wood charge/charcoal temperatures, and is scaled in degrees Celsius. The abscissa represents real time and is scaled in hours. A complete batch process cycle has five production phases. These include a loading phase 218, a drying phase 219, a pyrolysis phase, 220, a cooling phase 221, and an unloading phase 222. The sum duration of all phases is the batch cycle time. The full batch cycle time for charges having a wood moisture content less than 40% is approximately 48 hours.

In the loading phase 218 the raw material charge is loaded into the kiln subassembly structure (104, FIGS. 3-5). The charge is a woody material type having a cellulosic fiber structure. From a functional standpoint the woody material may comprise any of several forms, such as wood stock, tree bark, and twigs. However, consideration must be given to the average size, i.e. volume, of individual pieces of the charge since smaller sized pieces will reduce the time required for the drying, pyrolysis, and cooling phases (219-221), but will also make material handling more difficult in the loading and unloading phases 218, 222.

In the best mode embodiment larger material piece sizes are preferred. This in particular includes green wood logs in the form of unhewn timber which may range in diameter from substantially 150 mm (6 inches) to substantially 254 mm (10 inches). This is not a limitation of the invention, but a preferred range of diameters which balances the competing interests of minimizing the cost of the charge materials versus the minimizing time required to complete batch cycle so as to increase kiln turn-around time. The batch cycle time is directly proportional to the mass of the charge material pieces. Logs with half the 8 inch average diameter of the above range can substantially reduce the cycle time, but at the expense of the time and labor costs required to split the logs.

In the best mode embodiment, operator controlled machinery, such as a front end loader, is used to load the wood logs into the kiln structure 104 (FIG. 3). The I beams 144 of the kiln subassembly floor 142 are capable of supporting the fully loaded machine, which is driven into the kiln to stack the logs from the back to the front of the structure. The logs are placed directly on the grating 152, substantially transverse to the beams 144, as figuratively illustrated by the logs 150 shown in phantom in FIG. 5. In FIG. 8, the time allocated to the loading phase 218 is two hours, as designated by the time interval $T_0$-$T_1$.

With the kiln loaded at time $T_1$, the kiln doors 112, 114 (FIG. 3) are secured and the drying phase 219 begins. Referring to FIG. 2, the kiln assembly valves 66, 72, 78, and 80, which were closed at the beginning of the unloading phase, remain closed as the operator at the Control Console turns on the recirculation fan 62. Control valves 66, 72 are then opened while valves 78, 80 remain closed. The valves 66, 72 are opened incrementally, in steps, over a period of several minutes to allow for a gradual warm-up of the recirculation fan as it pulls in an increasing volume of hot process gases. With the valves full open the fan draws a substantially constant volume of hot combusted gases from the supply duct 28. The hot process gases are nominally at a constant 375° C. (707° F.) temperature, and are forced by the fan through the kiln manifold 60 and inlet ports 54-57 at 50 ft/sec. flow rate, and enter the kiln structure's lower level section 136 (FIG. 5). The flow velocities 148 of the hot process gases into the section 136 are about 1 ft/sec., and from there they flow upward through the grating 152 into the charge.

In the kiln interior 140 (FIG. 3A) the hot process gases flow through the piled logs in a complex web of predominately upward flows, traveling in random patterns through the wood bed that blocks almost all of the free flow area. The instant direction of individual flows and their flow velocities depends on the wood packing density of the charge, but with the narrow passages their velocities are much higher than the flow velocity at the kiln inlet port 50, so as to provide the convection coefficients needed to dry, carbonize and cool the charcoal in a relatively short batch cycle time. As the gases exit the charge they are funneled through the plenum formed by the arched roof 110 and discharged though outlet port 52 to the discharge duct 70, and are returned through control valve 72, outlet duct 76, and return header 38 to the combustion chamber 155 (FIG. 6).

The sensors 96, 98 mounted at the inlet and outlet ports 50, 52 of the kiln subassembly 48 (FIG. 2) sense the actual temperatures of the kiln structure inlet gases and the kiln structure outlet waste gases and these values are displayed at the Control Console 46. As the drying phase begins at time $T_1$ the 375° C. kiln structure inlet hot process gas is forced through the source material charge and is cooled by the moisture in the wood. The moisture reduces the temperature of hot process gases so that at discharge from the kiln subassembly outlet port 52 it may be reduced to less than 150° C. (302° F.) from the 375° C. inlet temperature. As the wood is heated its temperature begins increasing from room temperature. At about 212° F. (100° C.) the hygroscopic water begins to vaporize. The vaporization cools the inlet 375° C. hot process gas and more or less maintains the flow discharge temperature at outlet 52 at less than 150° C. (302° F.) until vaporization is complete. The wood temperature for any particular element of the charge cannot increase further until all of the moisture in that element is boiled away. But once that occurs the wood temperature rises rapidly.

This rapid temperature rise is easily detected in the sensed actual temperature of the outlet port gases by the sensor 98, and marks the end of the drying phase and the start of the pyrolysis. However, as understood by those skilled in the art, not all of the charge's wood pieces complete their drying cycle at the same time. Depending on their relative size, and their location within the charge pile, they complete their drying phase at different times. FIG. 8 shows two waveforms. The solid line waveform 224 and dashed line waveform 226 represent the extremes of the drying cycle response times. The solid line waveform 224 is the response of the fastest drying elements of the charge, typically those pieces at the bottom of the charge pile and at the exposed surfaces of the logs which are directly exposed to the 375° C. gases rising through the grating 152. The dashed line waveform 226 is the response of the slowest drying elements, typically those at the very top of the charge pile and at the inner core of the logs. There the hot process gases are cooler, having given up heat to the wood below.

In FIG. 8 the fast drying charge elements of waveform 224 complete their drying phase by time $T_2$, as marked by the sudden rise in temperature of waveform segment 224A. The slower drying elements complete their drying time approximately seven hours later, at time $T_3$, which is identified by the sudden rise in temperature of waveform segment 226A. At this time the drying phase for the full charge is complete and the pyrolysis phase has begun with the fast drying elements having reached the 280° C. (536° F.) pyrolysis wood temperature threshold, as shown in waveform segment 224B.

It is understood by those skilled in the art that the temperature at which pyrolysis begins depends on the particular material being charcoalized, so that the 280° C. is only a nominal pyrolysis threshold. This variation among materials coupled with different positioning of the charge elements in the pile accounts for the time tolerances between end of drying and beginning of pyrolysis. The very rapid increase in wood temperature is due to a combination of the reduced thermal inertia of the dry wood and the heat generation from the pyrolysis. Empirical data suggests that the fast climb in temperature of the wood begins as early as 125 C, as shown in FIG. 8.

As an exothermic reaction, pyrolysis generates its own heat so that external heat is no longer needed to heat the wood charge. However, the reaction also produces volatile organic compounds (VOC), which include noncondensable gases (carbon monoxide [CO], carbon dioxide [$CO_2$], methane, and ethane), pyroacids (primarily acetic acid and methanol), tars, and water. The VOC formation is generally ongoing by 280° C. (536° F.), but may begin as early as 125 C (257° F.), and the pyrolysis wood temperature and its distillate volume increases until the exothermic reaction ends at about 350° C. (662° F.), when the wood is transformed to charcoal.

The present invention prevents atmospheric release of the VOC distillate by burning it in the combustion chamber 155 (FIG. 6) as the system's primary source of fuel. The distillates must be purged from the kiln subassemblies and recycled to the combustor 26 (FIG. 1). In the present system the combusted hot process gases are used to do the purging. Following the drying phase the kiln assembly valves 66, 72 remain open through the pyrolysis phase, and the combusted gases force the VOCs from the kiln and through discharge ducts 70, 76 (FIG. 2) and return duct 38 to the combustion chamber 155 (FIG. 6). While this sacrifices system thermal efficiency, it simplifies the system infrastructure by using a single gas distribution system for heating and purging. Since the combusted gases have no free oxygen there is no concern that they will burn the wood charge.

The use of the combusted hot process gases to do the purging does, however, limit the ability to measure the progress of the pyrolysis reaction by quantitative temperature measurement, since the available kiln temperature sensors 96, 98 only measure inlet and outlet gas temperatures. Fortunately, its not necessary to be precise in tracking the pyrolysis since the reaction is well known, and for a given size charge and kiln design, is sufficiently repeatable to be tracked as a timed event. Also, the outlet temperature provides a first order measure of the progress of the entire process. Just as the rapid temperature "breakpoint" signifies the end of the drying phase and the beginning of pyrolysis, the crossover of the outlet temperature above the substantially constant 375° C. provides evidence that the exothermic reaction is close to completion. The outlet temperature will likely continue to rise after crossover until the reaction stops, and then begin to drop. If left unattended the outlet temperature would decrease to the inlet temperature magnitude in the steady state, but it is not necessary to wait that long since the lapsed time also corroborates event completion.

While quantitative measure is possible using sacrificial thermocouples buried in the charge, the gained accuracy does not justify the costs of the thermocouples or their installation due to the predictability of the process. Once again, for a constant sized kiln and with reasonable repeatability of the size of the charge, the completion of pyrolysis can be confirmed with good accuracy as a timed event.

With respect to FIG. 8, the pyrolysis phase is assumed to begin with completion of the drying of the full charge at time $T_3$. Although pyrolysis of the fast drying articles has begun by this time, it is on-going. The slower drying elements are assumed to reach the pyrolysis threshold at time $T_4$, as shown by waveform segment 226B, while the fast drying elements are shown by waveform segment 224C to have reached the pyrolysis end point temperature of 350° C. (662° F.). In the following $T_4$ to $T_5$ interval, approximately 2.5 hours, the slower drying elements have also completed pyrolysis, as shown by waveform segment 226C. At this time the pyrolysis phase for the full charge is complete.

In addition to the VOC, pyrolysis also produces less volatile tarry materials which continue to evolve until the kiln temperature reaches 450° C. (842° F.). However, the elevated kiln temperatures resulting from the combination of the combusted hot process gases and the exothermic temperatures keep the internal wall temperatures of the discharge ducts 70, 76 and return duct hot enough to keep the tars entrained in the gas stream. This allows them to be returned to the combustor where they are cracked and burned, preventing their condensation in the system.

At time $T_5$ the wood charge has been fully converted to charcoal and the cooling phase begins. Referring to FIG. 2, at the initiation of the cooling phase the actuators 68, 74 are command actuated from the Operator Control Console 46 (FIG. 1) to close flow valves 66 and 72, and actuators 82, 84 are actuated to open valves 78, 80, and cooling air fan 90 is turned on. This removes the hot process gas supply from the kiln structure inlet and closes the return path to the combustor for the kiln discharge gases. The kiln discharged gases are now recirculated through the waste gas cooler, or heat exchanger 88. Within the cooler 88 the kiln discharge gases are passed across internal surfaces which are cooled by ambient air forced across these surfaces by the fan 90. The ambient air absorbs the heat energy of the kiln gas and the heated ambient air is discharged at the cooler's outlet 92.

As shown by the FIG. 8 waveform segments 224D and 226D, the charcoal product cooling phase begins at time $T_5$ and ends at time $T_6$. The cooling occurs in a controlled atmosphere within the kiln subassembly which is devoid of oxygen, and the charcoal does not ignite. The cooling interval is approximately 19 hours long. At time $T_6$, with the charcoal average temperature less than 100° C. (212° F.), the kiln assembly actuators 82, 84 are actuated by the operator at Control Console 46 (FIG. 1) to close flow valves 78, 80, and the fans 62 and 90 are shut off. At this time the charcoal product is complete. The kiln doors are opened and the charcoal is unloaded. Using motorized equipment, such as a front loader, the charcoal may be unloaded in an hour and at time $T_7$, 48 hours from the beginning time $T_0$, and the batch process cycle is complete.

As understood by those skilled in the art, the time versus temperature characteristics of waveform 224 for the fastest drying charge pieces and waveform 226 for the slowest drying charge pieces, represent the boundaries of the charge time-temperature conversion cycle from its woody material, cellulosic fiber structure, to the charcoal state. All elements of the charge are between these limits The energy value of the VOC distillates and combustible gases produced in the pyrolysis phase represents some fifty percent (50%) of the gross calorific value of the original dry wood. The present invention reclaims this energy by burning the VOC emissions as fuel to produce the combusted hot process gases supplied to the kilns. The combustion efficiency of the VOC is dependent on the density of the constituent combustibles and may range from seventy to eighty five percent (70%-85%), and is nominally seventy five percent (75%). As shown in FIG. 8, the pyrolysis phase in which most of the VOC emissions are produced (some VOC evolves at low temperatures) is an 8 to 10 hour interval. This is about one sixth the full 48 hour cycle time. To ensure availability of VOCs as fuel it is then necessary to stage the batch process cycles of individual kilns at scheduled intervals. With the minimum nine kilns, each with a 48 hour batch cycle time and an assumed eight hour pyrolysis phase, a suitable sequence is to schedule the kilns at substantially 5 hour 20 minute start intervals.

Figure 9:
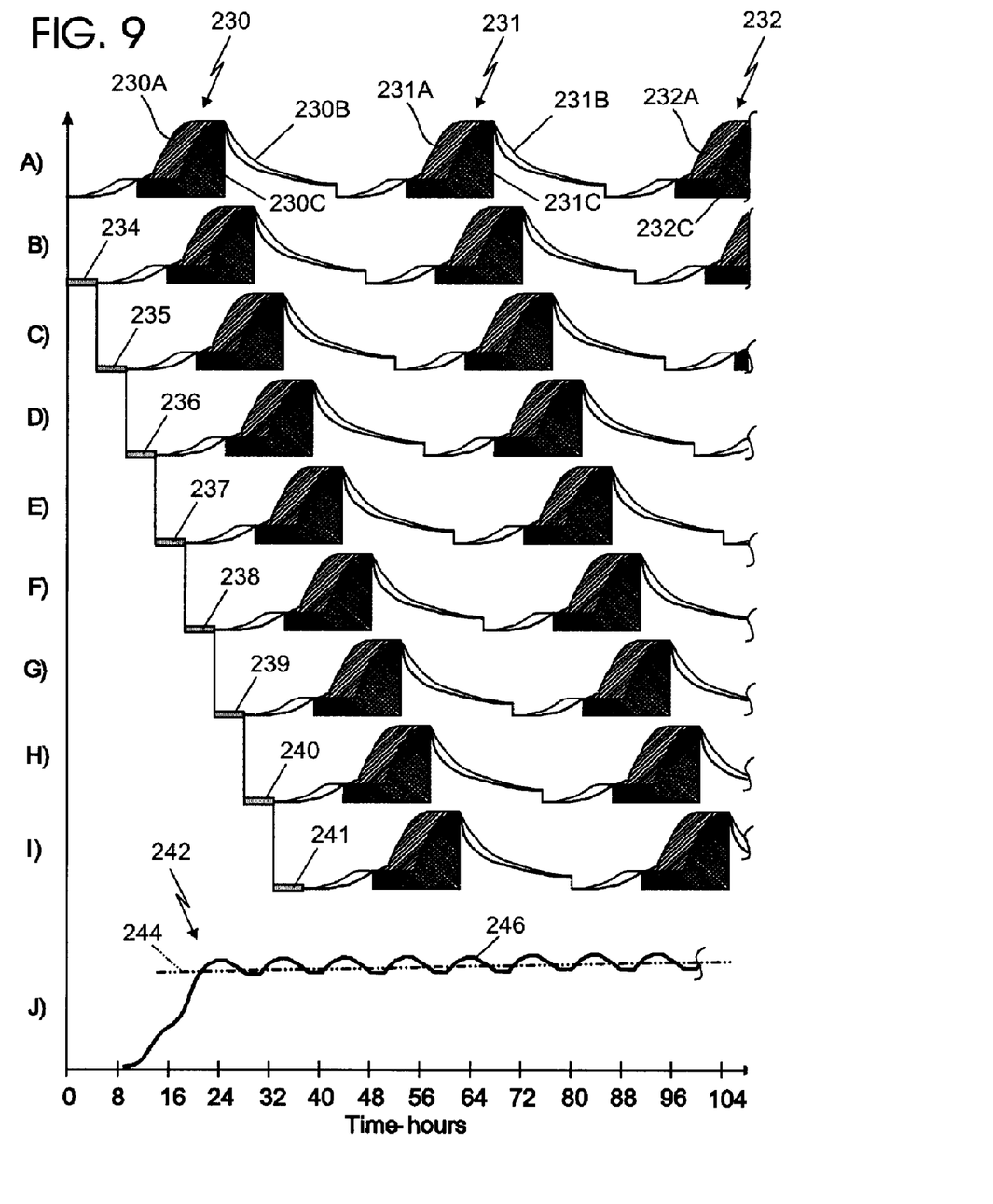
FIG. 9 is another waveform illustration used in the description of operation of the embodiment of FIG. 1.

FIG. 9, illustrations A) through I) represent the individual batch process cycle, time versus temperature waveforms of nine kiln assemblies that are scheduled at 5 hour 20 minute spaced time intervals. In each of the waveform illustrations, such as illustration A, the batch cycle waveforms 230-232 have shaded areas 230A-232A which represent the extreme boundaries of the pyrolysis phase, and un-shaded areas 230B-232B that represent the cooling and unloading phases. Illustration A) represents the waveform for the kiln beginning at time zero, and illustrations B) through I) are associated with kilns beginning operation at scheduled spaced intervals 234-241, each of which is at a nominal 5 hour 20 minute start delay from the preceding kiln. A conservative estimate of that interval within which the VOC distillates and combustible gases are available is shown by the cross hatched areas 230C-232C. These cross hatched areas correspond to that area below the FIG. 8 dashed waveform 226 between the times $T_2$ and $T_5$.

In FIG. 9, illustration J), is a qualitative waveform illustration 242 of the sum calorific energy available to the combustion chamber 155 (FIG. 6) from the pyrolysis phase of the nine kiln assemblies, beginning with the system start-up at time zero. This VOC energy is both produced by, and consumed by the charcoal process. The instant value of available energy is directly proportional to the number of kilns producing the VOC and the instant energy demand is dependent on the number of kilns that are consuming the combusted gases. Clearly, the kilns consume energy in the drying phase (219, FIG. 8) and the amount of energy consumed is directly proportional to the moisture content of the charge wood. The drying phase is 11 hours or 23% of the 48 hours required for the kiln turn-around.

In the best mode embodiment the system also uses the combusted hot process gases to purge the kilns of VOC during the pyrolysis phase (220, FIG. 8). There, however, the exothermic reaction is self heating so as to consume little or none of the heat energy of the purging combusted gases, while also producing excess energy in the form of the VOC distillates. Therefore, the combusted hot process gas energy consumed during this phase is limited to that attributable to thermal losses incurred in circulating the hot process gases through the kilns, which is here referred to as "transport losses". The energy generating pyrolysis phase is 15 hours long, or 31% of the total 48 hour process cycle and 1.36 times longer than the energy consuming drying phase.

While difficult to quantify it is nevertheless apparent that the process itself is more heavily weighted toward the production of energy rather than its consumption. It is also apparent that there are variables in the execution that can tip the balance. System energy losses are one variable. These losses are attributable to insufficient thermal insulation in the system duct work as well as combustion inefficiency. They are, however, controllable, subject to cost constraints. The more significant, less controlled variable is the moisture content of the raw wood charge. The economics of the process require local sourcing of the wood charge, which eliminates substitution as a practical solution. Similarly, the time required to air dry the charge before introducing it to the process is subject to real time demand for the charcoal product as well as the cost of labor and space to perform the air drying.

It is likely that with a minimum of nine kilns which are started at spaced intervals of approximately 5 hours, 20 minutes, and with a raw wood moisture content less that 30 percent (30%), that the process generated VOC can supply 100% of the present charcoal process energy demand. It is estimated that the generated VOC energy will satisfy only 50% of the energy demand for raw wood charges with a moisture content greater than 40%, and it is assumed that on average, over the range of wood moisture content that may be expected, that the VOC distillates will provide about 70% of the energy needed. Supplemental fuel provides the short fall.

FIG. 9 illustrates the importance of scheduling the energy production to provide a continuing supply. As shown the maximum available energy is reached at approximately 24 hours from time zero and remains at a constant average level 244 thereafter subject to a ripple 246 whose amplitude is inversely proportional to the number of kilns in the supply chain. Within the initial 24 hour period from start up (time zero), and during any intervals in which one or more kilns are removed from service, the combustor must rely on supplemental fuel to produce the combusted hot process gas supply.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

What is claimed is:

1. An apparatus for producing charcoal from a source material, comprising:
   a combustor ductile connected to a plurality of kiln assemblies;
   each kiln assembly including:
      a kiln structure adapted to house a raw material charge and process the raw material charge into charcoal;
      a heat exchanger in fluid communication with the kiln structure adapted to cool gases discharged from the kiln structure and selectively recirculate the cooled discharge gases through the kiln structure;
      a cooling mode apparatus capable of controlling the circulation of process gases between the kiln structure and the heat exchanger; and
      a heating mode apparatus capable of controlling the circulation of process gases between the combustor to the kiln structure to allow gases to flow from the combustor into the kiln structure in at least one of an exothermic phase and an endothermic phase.

2. The apparatus of claim 1 where each kiln assembly further includes:
   a control unit in communication with the cooling mode apparatus to provide circulation of process gases between the kiln structure and the heat exchanger in a cooling phase.

3. The apparatus of claim 2 where the control unit is in communication with the heating mode apparatus to provide circulation of process gases between the combustor to the kiln structure in a heating phase.

4. The apparatus of claim 3 where each kiln assembly further includes:
   a manifold connected to the kiln structure to supply the process gasses from the combustor or heat exchanger to the source material.

5. The apparatus of claim 4 where the manifold is connected to a support structure of the kiln structure.

6. A method for producing charcoal comprising:
   providing a combustor ductile connected to a plurality of kiln assemblies;
   each kiln assembly including a kiln structure communicating with a heat exchanger;
   charging the kiln structure with a raw material charge;
   directing circulation between the combustor to the kiln structure in a heating phase to allow gases to flow from the combustor into the kiln structure; and
   directing circulation between the kiln structure and the heat exchanger in the cooling phase to cool gases discharged from the kiln structure and selectively recirculate the cooled discharge gases through the kiln structure.

7. The method of claim 6 further comprising:
   isolating the heat exchanger from the kiln structure in the heating phase.

8. The method of claim 7 further comprising:
   isolating the kiln structure from the combustor in the cooling phase.

9. A system for producing charcoal comprising:
   a combustor ductile connected to a plurality of kiln assemblies;
   each kiln assembly including:
      a kiln structure adapted to house a raw material charge and process the raw material charge into charcoal;
      a heat exchanger communicating with the kiln structure adapted to cool gases discharged from the kiln structure and selectively recirculate the cooled discharge gases through the kiln structure;

a cooling mode apparatus capable of controlling the circulation of process gases between the kiln structure and the heat exchanger; and a heating mode apparatus capable of controlling the circulation of process gases between the combustor to the kiln structure to allow gases to flow from the combustor into the kiln structure in at least one of an exothermic phase and an endothermic phase; and a control console in communication with the heating mode apparatus to provide circulation of process gases between the combustor to the kiln structure in a heating phase, and in communication with the cooling mode apparatus to direct circulation of process gases between the kiln structure and the heat exchanger in a cooling phase.

10. The system of claim 9 further comprising:

a manifold connected to each of the kiln structures to supply the process gasses from the combustor or heat exchanger to the source material.

* * * * *